United States Patent
Rajagopal (10) Patent No.: US 8,306,148 B2
(45) Date of Patent: Nov. 6, 2012

(54) METHOD TO REDUCE PEAK TO AVERAGE POWER RATIO IN MULTI-CARRIER MODULATION RECEIVERS

(75) Inventor: Ravikiran Rajagopal, Yardley, PA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 510 days.

(21) Appl. No.: 12/415,747

(22) Filed: Mar. 31, 2009

(65) Prior Publication Data

US 2010/0124293 A1    May 20, 2010

Related U.S. Application Data

(60) Provisional application No. 61/116,533, filed on Nov. 20, 2008.

(51) Int. Cl.
*H04L 27/00* (2006.01)
(52) U.S. Cl. ......................................... 375/295
(58) Field of Classification Search ............ 375/295, 375/296, 297, 284, 285
See application file for complete search history.

(56) References Cited

U.S. PATENT DOCUMENTS

2006/0013338 A1    1/2006  Gore et al.
2007/0242598 A1*  10/2007  Kowalski .................. 370/206

OTHER PUBLICATIONS

Chari, M. R., et al., "FLO Physical Layer: An Overview," IEEE Transactions on Broadcasting, vol. 53, No. 1, Mar. 2007; pp. 145-160.
Gao, F., et al., "Scattered Pilots and Virtual Carriers Based Frequency Offset Tracking for OFDM Systems: Algorithm, Identifiability, and Performance Analysis," IEEE Transactions on Communications, vol. 56, No. 4, Apr. 2008; pp. 619-629.
Svedman, P., et al., "Using Unclaimed Sub-carriers in Opportunistic OFDMA Systems," 64th IEEE Vehicular Technology Conference, Sep. 25-28, 2006; 5 pages.
International Search Report directed to related International Patent Application No. PCT/US2009/064403, mailed Jan. 28, 2011, from the European Patent Office; 6 pages.
International Preliminary Report on Patentability and the Written Opinion of the International Searching Authority directed to related International Patent Application No. PCT/US2009/064403, issued May 24, 2011, from the International Bureau of WIPO; 10 pages.
European Search Report directed to related European Patent Application No. 09 756 614.5-1237, mailed Apr. 2, 2012, from the European Patent Office; 5 pages.

* cited by examiner

*Primary Examiner* — Kevin Kim
(74) *Attorney, Agent, or Firm* — Volpe and Koenig, P.C.

(57) ABSTRACT

Provided is a method for performing channel estimation in an Orthogonal Frequency Division Multiplexed (OFDM) signal. The method includes performing the channel estimation based upon use of reserved tone channel carriers.

16 Claims, 6 Drawing Sheets

METHOD TO REDUCE PEAK TO AVERAGE POWER RATIO IN MULTI-CARRIER MODULATION RECEIVERS

CROSS-REFERENCE TO RELATED APPLICATIONS

This application claims the benefit of U.S. Provisional Application No. 61/116,533, filed Nov. 20, 2008, which is incorporated herein by reference.

BACKGROUND OF THE INVENTION

1. Field of the Invention

The present invention generally relates to digital video broadcasting (DVB). More specifically, the present invention relates to reducing Peak to Average Power Ratio (PAPR) in multi-carrier modulation based DVB systems.

2. Background Art

As known to those of skill in the art, DVB is the European consortium standard for the broadcast transmission of digital terrestrial television. DVB systems transmit a compressed digital audio/video stream, using multi-carrier modulation, such as orthogonal frequency division multiplexing (OFDM). Another popular method of transmitting signals is digital video broadcasting-terrestrial (DVB-T). When broadcasters employ this method, the transmitted signals do not travel via cable. Instead, they move from aerial antenna to aerial antenna, and from a signal blaster to home receiver.

DVB-T broadcasters transmit data using a compressed digital audio-video stream, with the entire process based on a Moving Picture Expert Group (MPEG)-2 standard. These transmissions can include all kinds of digital broadcasting, including high definition television (HDTV) and other high-intensity methods. This is an improvement over the old analog signals, which required separate streams of transmission.

Impulse noise is a growing concern in DVB-T transmissions because of its negative impact upon transmitted digital data and is common in OFDM based systems. Although OFDM based DVB-T system receivers provide a level of inherent immunity against impulse noise, this immunity is insufficient to ensure that digital TV signals are reliably transmitted in accordance with applicable standards. As an example, OFDM systems include data that is transmitted on multiple carriers simultaneously. In real life, when data is transmitted, it is passed through a data channel. This data channel subsequently manifests itself as a multiplicative impairment (e.g., impulse noise) on one of more of these carriers when they are received on a receiver side.

While impulse noise has traditionally been ignored in North American TV receiver market, several standards/specifications in the European market require high tolerance to impulse noise. Another troublesome aspect of OFDM systems is PAPR, which impacts the presence and effects of impulse noise. By reducing PAPR, the effects of impulse noise can correspondingly be reduced.

Some of the traditional techniques for reducing PAPR in OFDM systems include, by way of example, tone reservation, tone injection, or adaptive constellation extension. Each of these techniques is well understood by those of skill in the relevant art and will not be discussed in depth herein. All of these techniques, however, cause either a loss in data rate or an increase in the signal-to-noise ratio (SNR) required for reception. These techniques, therefore, have only limited utility.

To assist a receiver in overcoming multi-path distortion, pilot signals with known data patterns are transmitted. The pilot signals, sometimes called pilot tones or simply pilots, are used to support channel estimation operations. Traditional channel estimation operations attempt to estimate the amplitude and phase distortion introduced by the communications channel and can thus compensate for the SNR losses discussed above. Although more effective than many of the other techniques, channel estimation operations are not precise enough to completely compensate for all SNR losses.

What is needed, therefore, are improved methods and systems for reducing PAPR in OFDM based DVB-T system receivers that can compensate for corresponding losses in SNR.

BRIEF SUMMARY OF THE INVENTION

Consistent with the principles of the present invention as embodied and broadly described herein, the present invention includes a method for performing channel estimation in an Orthogonal Frequency Division Multiplexed (OFDM) signal. The method includes performing the channel estimation based upon use of reserved tone channel carriers.

Embodiments of the present invention provide reductions in PAPR comparable to the traditional techniques above. In the embodiments of the present invention, however, SNR losses are compensated for by improving the precision of the channel estimation process.

By way of example, OFDM systems work by splitting a wide-band digital signal into a large number of slower digital streams and then transmitting them all of the streams on a set of closely spaced adjacent carrier frequencies (i.e., tones). Each of the streams includes different types of tones. For example, a typical stream (e.g., symbol) might include data carries, reserved tones, continuous pilots, and scattered pilots. As understood by those of skill in the art, some of these tones can be reserved for PAPR reduction. Once the data carriers are filled with data, appropriate values of the extra data (i.e., channel estimation data) are inserted into the reserved carriers to decrease the PAPR of the time domain signal.

The present invention parameterizes an allowable set of values for the reserved tones. Typical parameterizations include values from a linear feedback shift register, or a finite number of known quantized values. The transmitter finds the best signal from the parameterized set of values for PAPR reduction, during an initialization process, and then signals the chosen parameters (possibly in a robust channel). The receiver then decodes the parameters and uses the reserved tones as additional pilots to improve channel estimation.

Some PAPR reduction is typically lost because the search space for data values for the reserved tones is reduced. However, given the more accurate channel estimation operations of the present invention, additional known techniques such as the Adaptive Constellation Extension (ACE) can be applied to gain further reductions. The process of computing the final reserved tone values can be arrived at via an iterative technique that includes multiple PAPR reduction techniques.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

It would be apparent to one of skill in the art that the present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Figure 1:
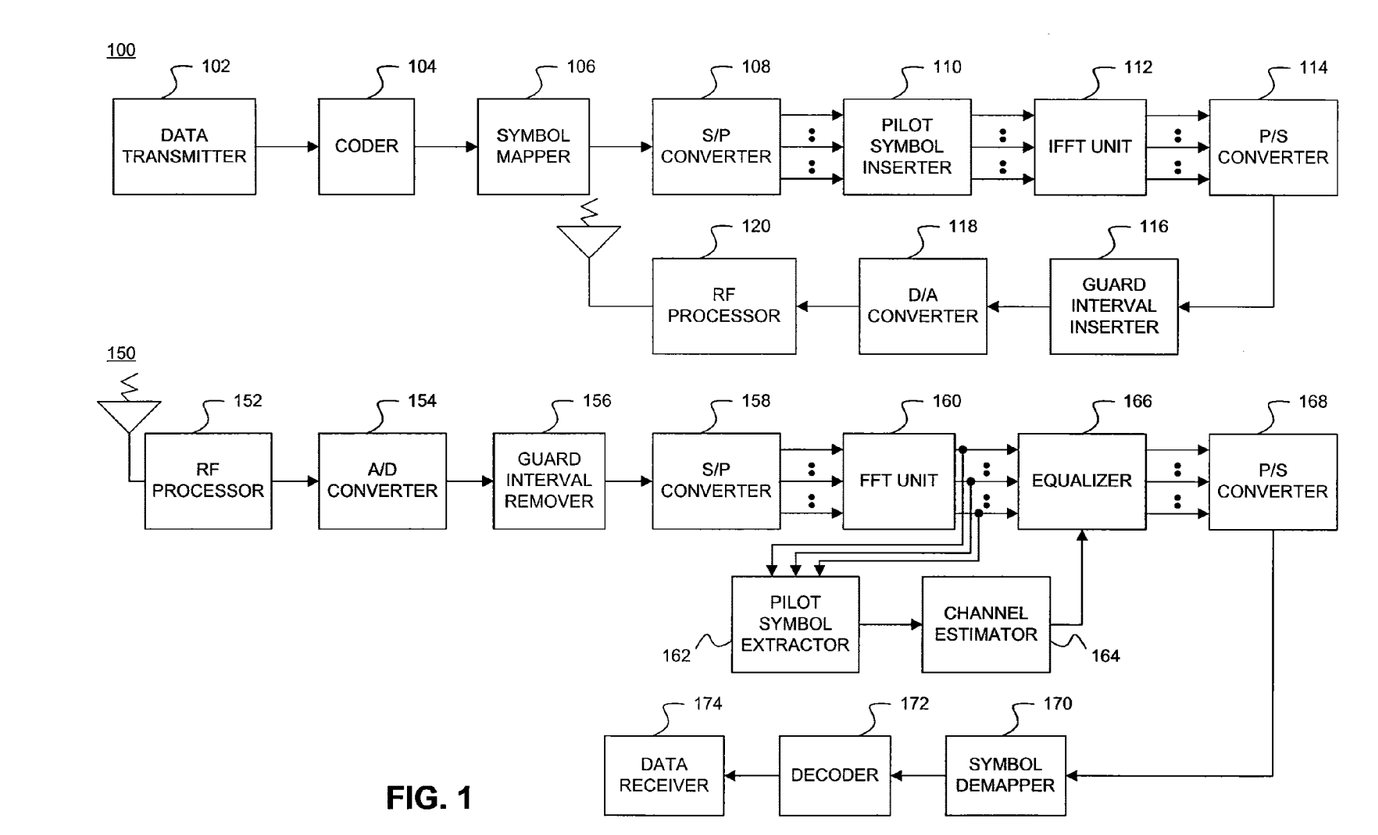
FIG. 1 is a block diagram illustration of a conventional OFDM based DVB-T system.

FIG. 1 is a block diagram showing constructions of transmission/reception terminals of a conventional OFDM mobile communication system. Referring to FIG. 1, a mobile communication system using OFDM scheme includes a transmission terminal 100 and a reception terminal 150. The transmission terminal 100 includes a data transmitter 102, a coder 104, a symbol mapper 106, a serial to parallel (S/P) converter 108, a pilot symbol inserter 110, an inverse fast Fourier transform (IFFT) unit 112, a parallel to serial (P/S) converter 114, a guard interval inserter 116, a digital-to-analog (D/A) converter 118, and a radio frequency (RF) processor 120.

In the transmission terminal 100, the data transmitter 102 generates and outputs user data bits and control data bits to be transmitted to the coder 104. The coder 104 receives and codes the signals outputted from the data transmitter 102 according to a predetermined coding scheme, and then outputs the coded signals to the symbol mapper 106. The coder 104 may perform coding by means of a convolutional coding scheme or a turbo coding scheme having a predetermined coding rate. The symbol mapper 106 modulates the coded bits outputted from the coder 104 according to a corresponding modulation scheme, thereby generating modulation symbols, and outputs the modulation symbols to the S/P converter 108. Here, the modulation scheme that the symbol mapper 106 may follow includes, e.g., a binary phase shift keying (BPSK) scheme, a quadrature phase shift keying (QPSK) scheme, a 16 quadrature amplitude modulation (QAM) scheme, 64 QAM scheme, or others.

The S/P converter 108 receives and converts the serial modulation symbols outputted from the symbol mapper 106 into parallel modulation symbols, and outputs the converted parallel modulation symbols to the pilot symbol inserter 110. The pilot symbol inserter 110 inserts pilot symbols into the converted parallel modulation symbols outputted from the S/P converter 108 and then outputs them to the IFFT unit 112.

The IFFT unit 112 receives the signals outputted from the pilot symbol inserter 110, performs N-point IFFT for the signals, and then outputs them to the P/S converter 114. The P/S converter 114 receives the signals outputted from the IFFT unit 112, converts the signals into serial signals, and outputs the converted serial signals to the guard interval inserter 116. The guard interval inserter 116 receives the signals outputted from the P/S converter 114, inserts guard intervals into the received signals, and then outputs them to the D/A converter 118. Here, the inserted guard interval prevents interference between OFDM symbols transmitted in the OFDM communication system; that is to say, the inserted guard interval prevents interference between a previous OFDM symbol transmitted during a previous OFDM symbol period and a current OFDM symbol to be transmitted during a current OFDM symbol period.

In inserting the guard interval, a method of inserting null data has been proposed. However, insertion of null data as a guard interval may cause a receiver to erroneously estimate a start point of an OFDM symbol, thereby allowing interference between sub-carriers, which increases the probability of erroneous determination of the starting point for received OFDM symbols. Therefore, a cyclic prefix method or a cyclic postfix method is usually used in inserting the guard interval. In the cyclic prefix method, a predetermined number of last bits of an OFDM symbol are copied and inserted into an OFDM symbol. In the cyclic postfix method, a predetermined number of initial bits of an OFDM symbol are copied and inserted into an OFDM symbol.

The D/A converter 118 receives the signals outputted from the guard interval inserter 116, converts the signals into analog signals, and outputs the converted analog signals to the RF processor 120. The RF processor 120 includes a filter and a front end unit. The RF processor 120 receives the signals from the D/A converter 118, RF-processes the signals, and then transmits the signals over the air through a Tx antenna. Hereinafter, the reception terminal 150 will be described.

The reception terminal 150 includes an RF processor 152, an analog-to-digital (A/D) converter 154, a guard interval remover 156, a S/P converter 158, a fast Fourier transform (FFT) unit 160, a pilot symbol extractor 162, a channel estimator 164, an equalizer 166, a P/S converter 168, a symbol demapper 170, a decoder 172, and a data receiver 174.

The signals transmitted from the transmission terminal 100 pass through multi-path channels and are received by an Rx antenna of the reception terminal 150 in a state in which noise is included in the signals. The signals received through the Rx antenna are inputted to the RF processor 152, and the RF processor 152 down-converts the received signals into signals of an intermediate frequency (IF) band, and then outputs the IF signals to the A/D converter 154. The A/D converter 154 converts the analog signals outputted from the RF processor 152 into digital signals and then outputs the digital signals to the guard interval remover 156.

The guard interval remover 156 receives the digital signals converted by and outputted from the A/D converter 154, eliminates guard intervals from the digital signals, and then outputs them to the S/P converter 158. The S/P converter 158 receives the serial signals outputted from the guard interval remover 156, converts the serial signals into parallel signals, and then outputs the parallel signals to the FFT unit 160. The FFT unit 160 performs N-point FFT on the signals outputted from the P/S converter 158, and then outputs them to both the equalizer 166 and the pilot symbol extractor 162. The equalizer 166 receives the signals from the FFT unit 160, channel-equalizes the signals, and then outputs the channel-equalized signals to the P/S converter 168. The P/S converter 168 receives the parallel signals outputted from the equalizer 166, converts the parallel signals into serial signals, and then outputs the converted serial signals to the symbol demapper 170.

As indicated, the signals outputted from the FFT unit 160 are also inputted to the pilot symbol extractor 162. The pilot symbol extractor 162 detects pilot symbols from the signals outputted from the FFT unit 160 and outputs the detected pilot symbols to the channel estimator 164. The channel estimator 164 performs channel estimation using the pilot symbols and outputs the result of the channel estimation to the equalizer 166. Here, the reception terminal 150 generates channel quality information (hereinafter, referred to as "CQI") corresponding to the result of the channel estimation and transmits the CQI to the transmission terminal 100 through a CQI transmitter (not shown).

The symbol demapper 170 receives the signals outputted from the P/S converter 168, demodulates the signals according to a demodulation scheme corresponding to the modulation scheme of the transmission terminal 100, and then outputs the demodulated signals to the decoder 172. The decoder 172 decodes the signals from the symbol demapper 170 according to a decoding scheme corresponding to the coding scheme of the transmission terminal 100 and outputs the decoded signals to the data receiver 174.

In OFDM systems, data is transmitted and received via multiple carrier frequencies. In some OFDM systems, for example, there can be approximately 128 independent OFDM sub-carriers (i.e., tones) that occupy approximately 528 megahertz of bandwidth. In these systems, data is modulated and transmitted via many of these sub-carriers. Approximately 10 of the sub-carriers do not necessarily carry information. These sub-carriers, also referred to as pilot tones, may be used to guard the information carrying sub-carriers, to simplify the filtering requirements of the system, or to provide reference phase/amplitude information for the demodulator. The positions of the pilot tones may be defined according to the communication standard or defined by the user/designer of the system. Some pilot tones are located on two ends of the frequency spectrum and some of the pilot tones are interspersed within the frequency spectrum.

For each transmitted carrier signal, an OFDM receiver normally attempts to compensate for the distortion induced by the transmission channel. This will normally involve a channel estimation operation and a channel compensation operation. To assist a receiver in overcoming multipath distortion, pilot signals with known data patterns are transmitted. The pilot signals, sometimes called pilot tones or simply pilots, are used to support channel estimation operations. Such channel estimation operations normally attempt to estimate the amplitude and phase distortion introduced by the communications channel.

The pattern structure of the pilots can be in essentially any manner, provided that the Nyquist sampling criteria for the communication channel's impulse response and rate of change are satisfied. The number of pilots transmitted is often a function of the expected multipath distortion delay and the anticipated rate of change in channel conditions. However, for purposes of efficiency, it is desirable to minimize the number of pilots transmitted since the transmission of a pilot precludes the transmission of data in the transmission slot used to transmit the pilot.

DVB-T OFDM systems often use their pilot tones for the purpose of making channel estimation easier. However, the sparseness of these tones renders it difficult to estimate the channel quickly and with efficient memory usage and calculations.

Channel estimation is an important and necessary function for modern wireless receivers. With even a limited knowledge of the wireless channel properties, a receiver can gain insight into the information that was sent by the transmitter. The goal of channel estimation is to measure the effects of the channel on known, or partially known transmissions. A channel will change with changing conditions and topology. OFDM systems are especially suited for channel estimation. The sub-carriers are closely spaced and the system is generally used in high speed applications that are capable of computing channel estimates with minimal delay. Subcarriers that are sent with a known power and make-up are called pilots and are used for synchronization and. As noted above, the present invention provides a unique and novel approach to accomplishing channel estimation.

More specifically, the present invention provides enhancements to known channel estimation techniques, such as tone reservation. In tone reservation, for example, carriers are reserved and populated with arbitrary values in order to decrease the PAPR.

The present invention, on the other hand, is illustrated in the following example. Assume that non-arbitrary values can be chosen for carriers that are known. That is, for example, in a given symbol, carriers 3, 7, and 10 are available and instead of using arbitrary values for each of these carriers can take five values (e.g., −2, −1, 0, 1, and 2). Thus, there are 125 choices (i.e., $5^3$). Assume that each of the 125 choices includes sufficient granularity such that the PAPR could be decreased by an amount comparable to PAPR reduction using the arbitrary values, noted above. In this scenario, the PAPR could be reduced almost as much as it could be by using the arbitrary values. By using small sets of non-arbitrary values, however, the receiver has more information with which to perform channel estimates and equalization. The ability to provide this information to the receiver enables these carries to be used as pilots. Traditionally, only dedicated pilots could be used to provide channel estimates. The present invention enables additional, non-pilot channel carriers, to be used to provide the channel estimates.

Figure 2:
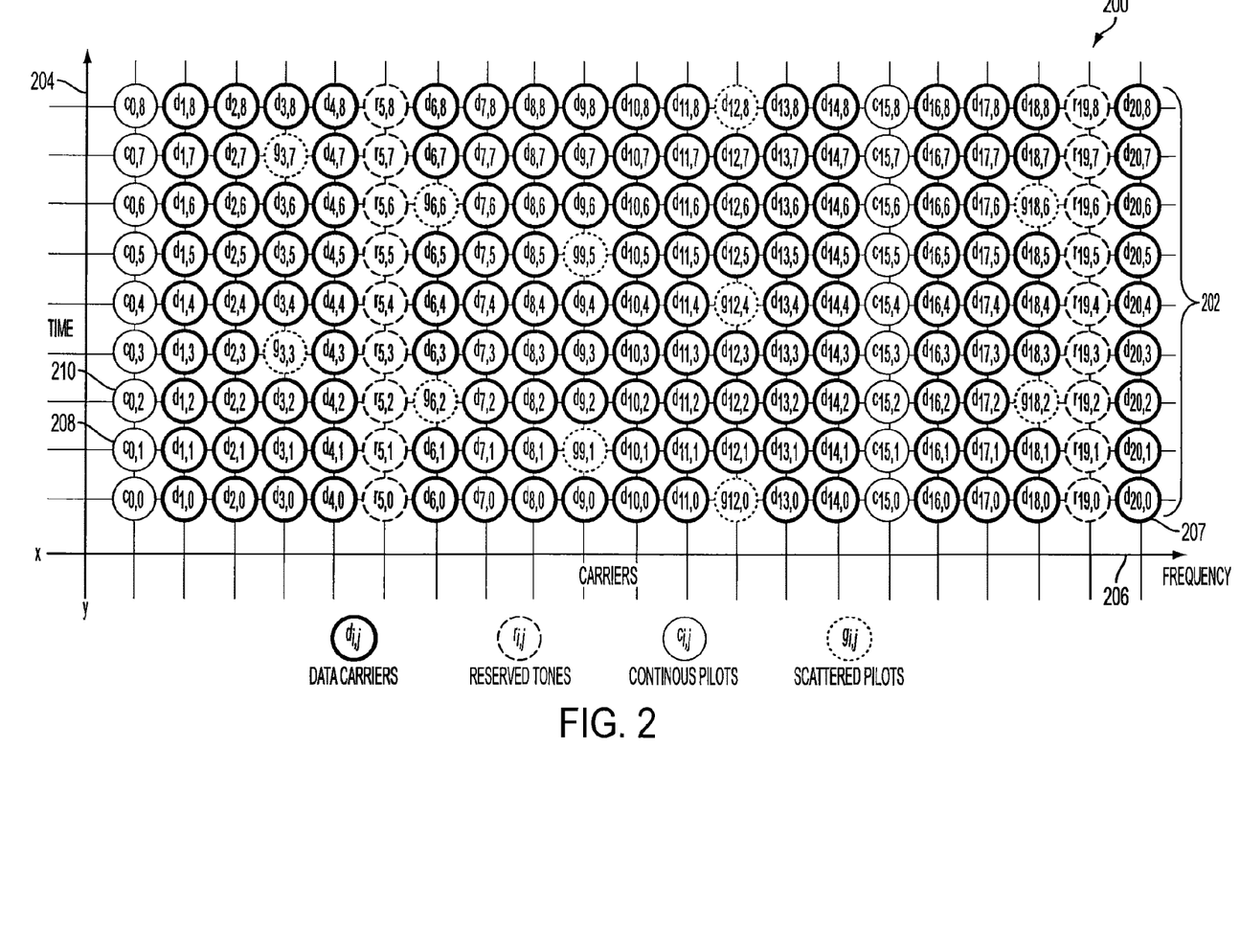
FIG. 2 is a graphical illustration of an exemplary pilot pattern sequence according to known channel estimation techniques.

FIG. 2 is a graphical illustration of a pilot pattern sequence 200 formulated in accordance with known channel estimation techniques. The pilot pattern sequence 200 includes a symbol group 202 of nine OFDM symbols arranged along a Y axis 204. The Y axis 204, for example, can be in gradations of 200 microseconds (μs) up to 1 millisecond. The fidelity of these gradations is dependent upon the total duration of each of the OFDM symbols. The graph of FIG. 2 also includes an X axis 206.

Each of the symbols within the symbol group 202 includes different carrier types comprising data carries ($d_{i,j}$), continuous pilots ($c_{i,j}$), scattered pilots ($s_{i,j}$), and reserved tones ($r_{i,j}$). The reserved tones ($r_{i,j}$) are generally unused. Although the pilot sequence 200 is representative of a sequence configured for use in a DVB-T2 system, it can apply to any OFDM system.

The first element in the carrier type subscript (e.g. $d_{i,j}$) represents a carrier index. The second element of the subscript represents a time index. For example, in FIG. 2, a first OFDM symbol 207, occurring at time 0 includes a continuous pilot $c_{0,0}$, a data carrier $d_{1,0}$, a data carrier $d_{2,0}$, etc.

In an OFDM symbol, the data carriers are representative of actual transmitted data. The continuous pilots and the scattered pilots are provided to be able to perform channel estimation. For the symbol 207, the continuous pilots are $c_{0,0}$ and $c_{0,15}$. The symbol 207 also includes a scattered pilot $s_{12,0}$. The notion of why two different types of pilots are used is well understood by those of skill in the art and will not be discussed herein.

Focusing on other aspects of pilots signals, most OFDM systems include the concept of having pilots that are not located within any particular system. For example, in the symbol group 202, all of the continuous pilots have a carrier index identical to other carrier pilots, meaning they are in vertical columns with other continuous pilots. For example, there are continuous pilots at carrier index "0" and carrier index "15." The fact that the continuous pilots are all in vertical columns together means that the pilot location stays the same, across different symbols. That is, if carrier 0 is a pilot in symbol 0 (i.e., symbol 207), then carrier 0 is also a pilot in a symbol 208, carrier 0 is also a pilot in symbol 210, etc. This process is typical of DVB-T systems and wireless local area network (LAN) systems.

The problem, however, with pilot configurations such as the configuration of FIG. 2 is that the density of the continuous pilots is typically insufficient to adequately perform channel estimation. To compensate for this lack of continuous pilot density, roving or "scattered" pilots are provided to augment the channel estimation capability of the continuous pilots. In FIG. 2, as discussed above, in the symbol 207 the scattered pilot is denoted as $s_{12,0}$. The symbol 208 includes a scattered pilot $s_{9,1}$ etc. These are the typical types of pilots that can be found in conventional OFDM systems.

Figure 3:
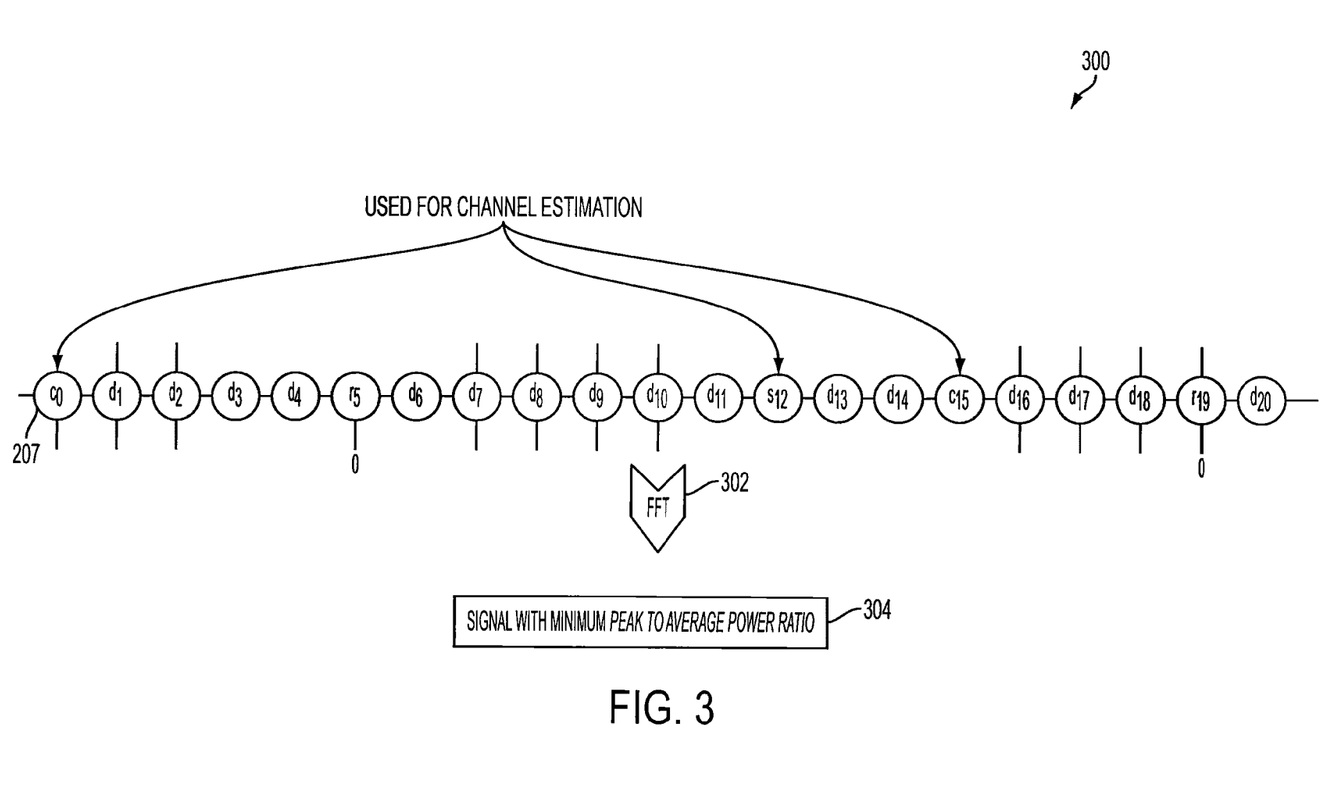
FIG. 3 is a graphical illustration of a single symbol sequence before choosing reserved tone values according to known channel estimation techniques.

FIG. 3 is a graphical illustration 300 of a single symbol sequence, prior to choosing reserved tone values, according to known channel estimation techniques. More specifically, FIG. 3 is an illustration of the single symbol 207 shown in FIG. 2, and is representative of a single symbol occurring at time index "0." In FIG. 3, the "0s" have been removed from the time index column for purposes of simplification.

By way of background, before reserved tones, such as the reserved tones $(r_{i,j})$, are assigned proper non-zero values, the data carries $(d_{i,j})$, the continuous pilots $(c_{i,j})$, and the scattered pilots $(s_{i,j})$ are assigned specific values first. After this assignment, a fast Fourier transform (FFT) 302 is applied to the values assigned to the data carriers, the continuous pilots, and the scattered pilots to create a time domain signal 304. This newly computed time domain signal 304, for example, might potentially have a high PAPR. If the time domain signal 304 has a high PAPR and if there are no reserve tones, the continuous pilots $(c_{i,j})$, and the scattered pilots $(s_{i,j})$ could be used to perform the channel estimation to decode (and record) the data embedded within the data carriers $(d_{i,j})$. In FIG. 3, values for the reserved tones $(r_5)$ and $(r_{19})$ are chosen as zero.

Figure 4:
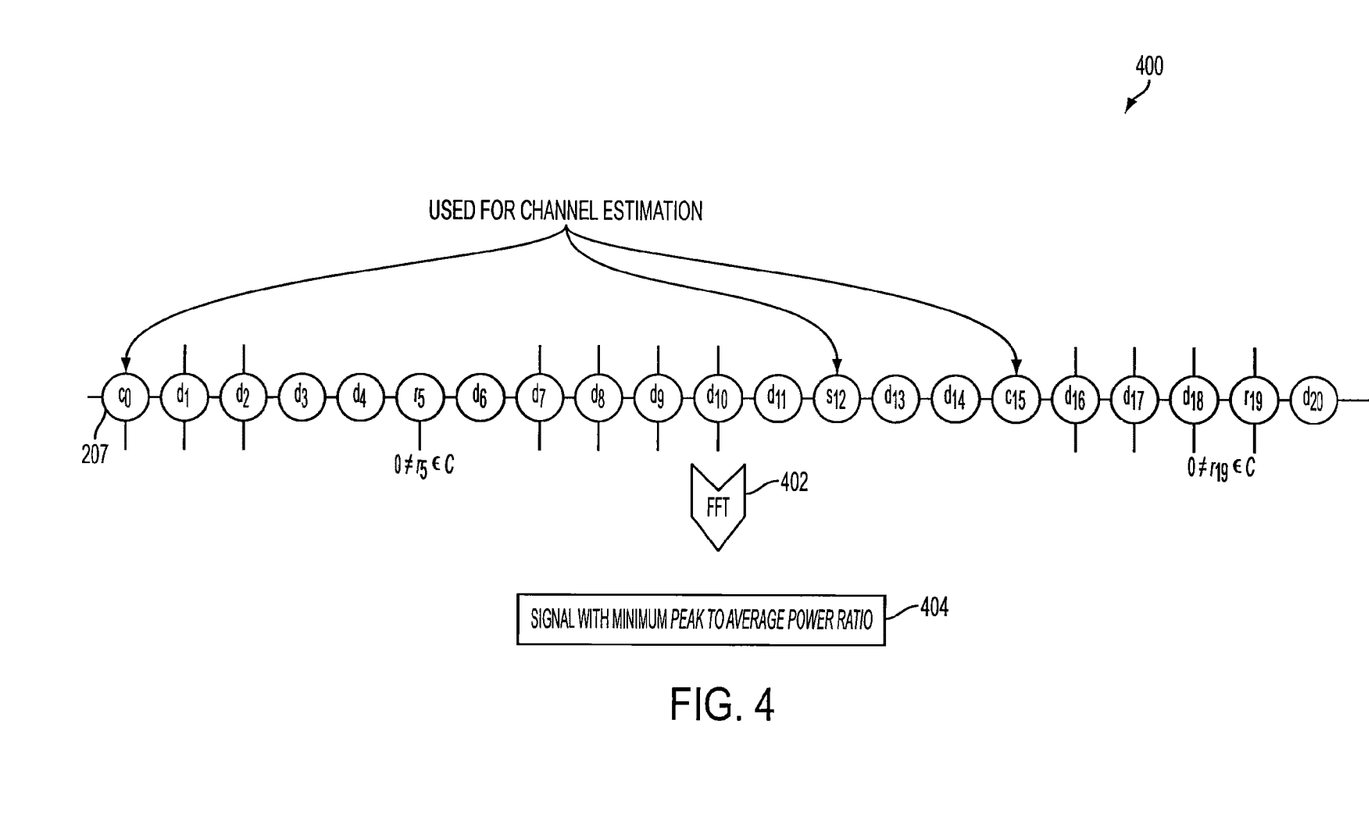
FIG. 4 is a graphical illustration of a single symbol sequence before choosing reserved tone values according to known channel estimation techniques.

FIG. 4 is a graphical illustration 400 of the single symbol 207 before choosing reserved tone values according to known channel estimation techniques. In FIG. 4, arbitrary values for the reserved tones $(r_{i,j})$ are selected. By way of example, using methods well understood by those of skill in the art, arbitrary non-zero complex values for the reserved tones $(r_5)$ and $(r_{19})$ can be selected. Methods for reserve tone determination and selection are provided, for example in a Thesis by J. Tellado, Peak to average power reduction for multicarrier modulation, Ph.D. dissertation, Stanford, Calif.: Stanford Univ., 2000. In FIG. 3, the values for $(r_5)$ and $(r_{19})$ are zero.

In FIG. 4, these reserve tone values, although arbitrary, are chosen to be non-zero values. More specifically, the non-zero values are chosen such that when an FFT 402 is applied thereto, a minimum PAPR can be achieved since the continuous pilots $(c_{i,j})$, the scattered pilots $(s_{i,j})$ and the data carriers $(d_{i,j})$ are fixed.

Before application of reserved tones, all carriers must have some value. Since the maximum transmit power is limited by regulation, if no carrier is used, its value is set to 0 so that the useful carriers may be transmitted at higher power. For the purposes of the present invention, however, these values can be selected randomly. This random selection would cause, with very high probability, the equivalent time domain signal to have high PAPR.

In embodiments of the present invention, instead of choosing the reserve tone values $(r_5)$ and $(r_{19})$ as arbitrary values, they are chosen to be part of a pilot pattern from some limited set, which is from a subset of reserved carrier pilots. In the present invention, the reserve tone values are not the same as the arbitrary values from FIG. 4. Instead, the reserve tone values $(r_5)$ and $(r_{19})$ are chosen to be close enough to the reserve tone values from FIG. 4 such that the resulting signal has a low PAPR. As a result of this value selection process, the reserve tones $(r_5)$ and $(r_{19})$ can be used as pilots to assist and improve the channel estimation process. This process is illustrated more clearly in FIGS. 5 and 6 below.

In accordance with known methods, such as those highlighted in the thesis noted above, reserve tone values can be determined. All of these values can be determined ahead of time. They can also, however, be determined dynamically during an iterative process that commences during receiver initialization. Generally, all these methods use a projection of signal peaks onto the reserved tones to produce a reduction signal. This reduction signal is then used for peak-canceling purposes in order to lower the PAPR of the OFDM transmitter.

In a first method, the first k reserved tones are allowed to be any of the elements from a known large set such as {a+ib, a is a multiple of 0.08 and so is b}. The later reserved tones are produced by filtering the previous tones with a known filter. In this scenario, the receiver would estimate the first k reserved tones using traditional methods and the rest would follow from them. Allowing for 64 different filters (requiring only 6 bits of signaling), allowing a and b to be between −2 and +2, and allowing k to be a small number (e.g., 15), numerous possible tone patterns can provide substantial PAPR reductions.

A second method for choosing reserve tone values is essentially the same as the first method above. In the second method, however, a and b are generated using linear feedback shift registers (LFSRs). Numerous other well known techniques for choosing reserve tone values are available.

Figure 5:
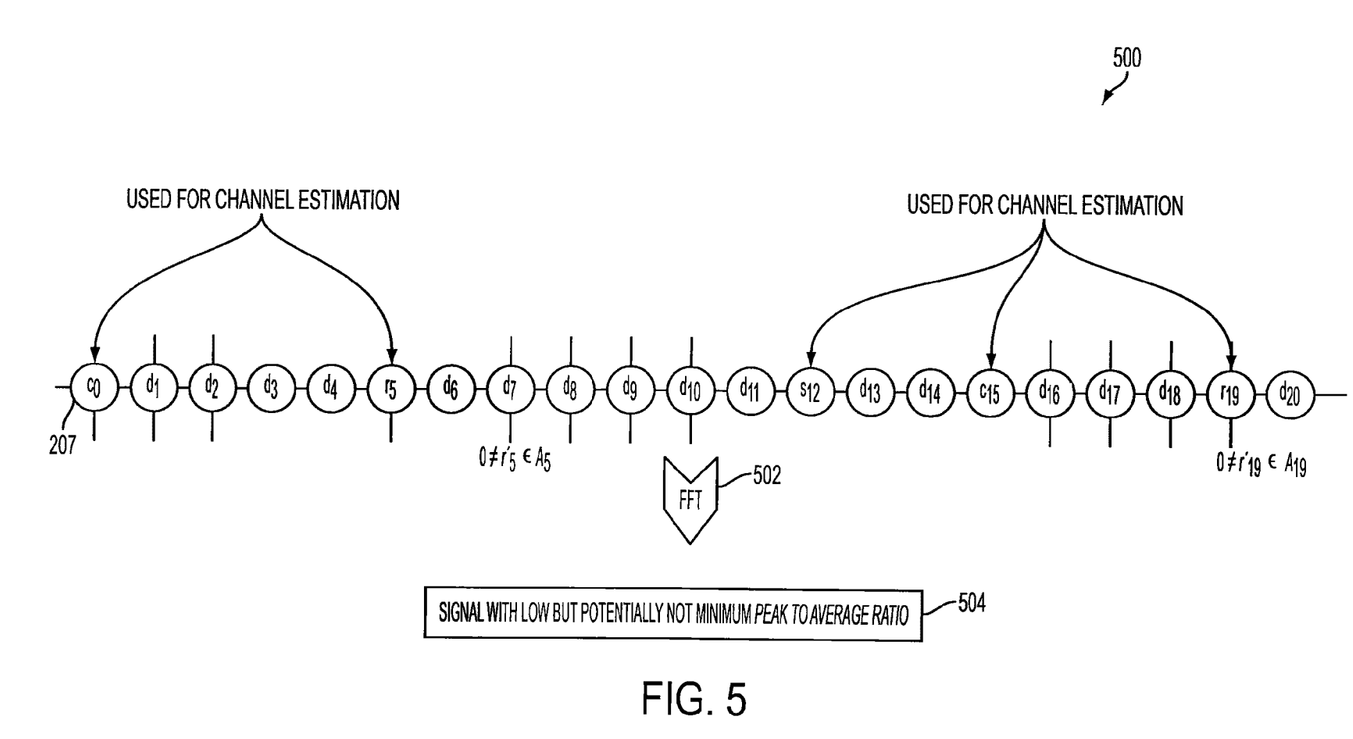
FIG. 5 is a graphical illustration of a single symbol sequence after choosing reserved tone values from known pattern subsets in accordance with an embodiment of the present invention.

FIG. 5 is a graphical illustration 500 of the single symbol sequence 207 after choosing reserved tone values from known pattern subsets, in accordance with an embodiment of the present invention. In FIG. 5, for example, in order to decrease the PAPR, the reserved tones $(r_5)$ and $(r_{19})$, which have similar characteristics to continuous pilots $(c_0,$ and $c_{15})$ and scattered pilot $s_{12}$, are used to assist in enhanced channel estimation. Although specifically dedicated reserve tones are used in the example of FIG. 5, scattered pilots could be used instead of reserved tones.

In FIG. 5, the value of reserved tones $(r_5)$ and $(r_{19})$ can be determined using one of the methods noted above. More specifically, reserved tone values for $(r_5)$ and $(r_{19})$, shown as $(r'_5)$ and $(r'_{19})$ respectively, are chosen to be non-zero and non-arbitrary. An FFT 502 is applied to the values ($r'_5$) and ($r'_{19}$) to produce a low, but not necessarily a minimum, PAPR 504.

The present invention includes embodiments that transmit known values to an OFDM receiver using reserved tones to provide more precise channel estimation. Middle values, chosen for the reserved tones, can be added or subtracted in accordance with the technique illustrated in FIG. 5, for all of the carriers. Middle values are those values that can be constrained (i.e., adding or subtracting other values) in different ways that will not adversely affect the PAPR reduction. These values can be constrained in some way, as represented by constraint sets A5 and A19 shown in FIG. 5, and are derived from a finite set. In this manner, the OFDM receiver has additional information that can be used to provide more accurate channel estimates, or decode or de-map the actual transmitted value more accurately. This process can also be used for tone injection.

In the embodiments discussed above, the use of middle values allows various techniques to be used to decrease the PAPR while simultaneously permitting reserve tone carriers, for example $r'_5$ and $r'_{19}$, shown in FIG. 5, to be used as pilot tones. If arbitrary complex values are used for the reserve tone carriers, higher PAPR reduction values can be achieved. However, it is possible to use sub-optimal, albeit acceptable, values for PAPR reduction, where there may be two or three possible constraint set solutions. For example, if three pilot carriers are used, middle values could be chosen such as 1, −1, and 2. Many other combinations of middle values can be chosen. So with these middle values, sequences can be used that will not adversely affect the PAPR reduction capabilities, but would fit within the constraint sets A5 and A19 (i.e., the set of values actually permitted), associated with $r'_5$ and $r'_{19}$, respectively.

Figure 6:
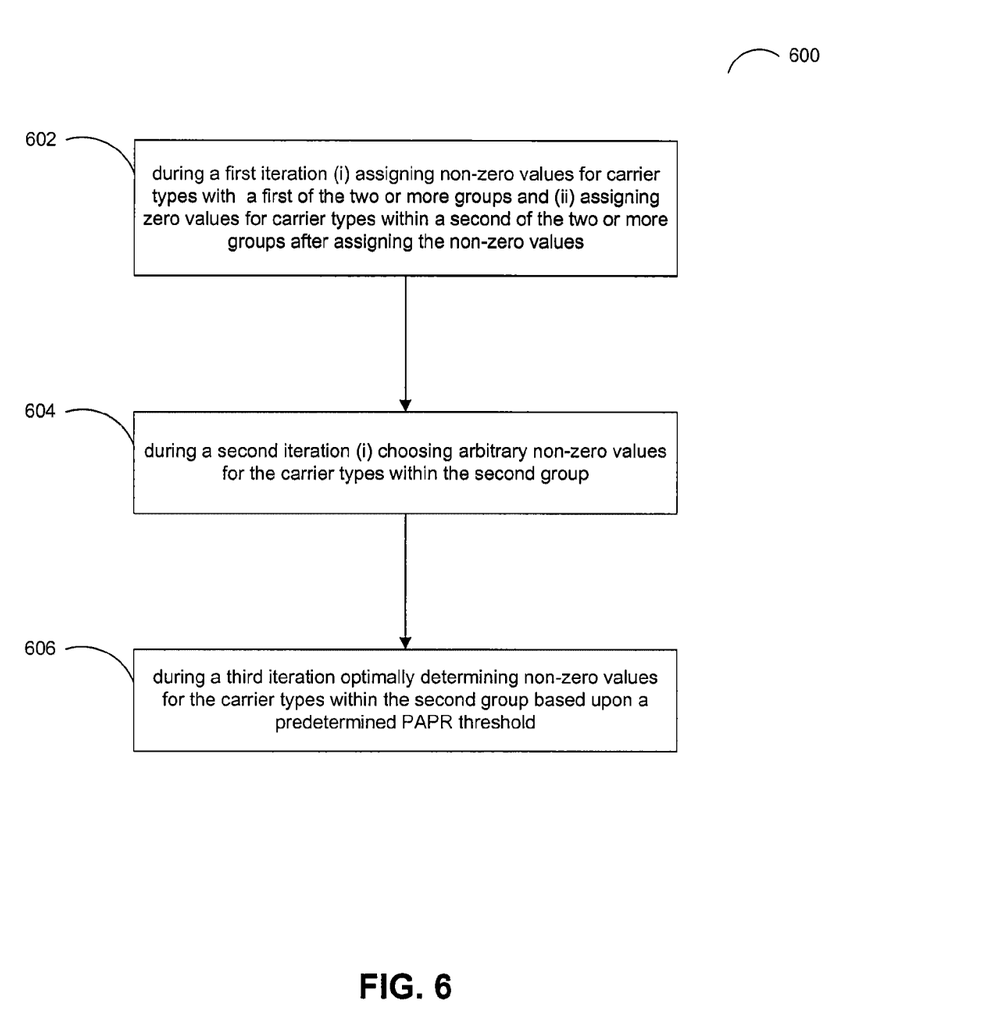
FIG. 6 is an exemplary flowchart of a method of practicing an embodiment of the present invention.

FIG. 6 is an exemplary flowchart 600 of a method of practicing an embodiment of the present invention. More specifically, he method 600 includes a method for decreasing PAPR for a multicarrier modulation signal including two or more groups of carriers. In a step 602 during a first timeframe, non-zero values are assigned for carrier types within a first of the two or more groups. Additionally, zero values are assigned for carrier types within a second of the two or more groups after assigning the non-zero values. During a second timeframe in step 604, arbitrary non-zero values are chosen for the carrier types within the second group. Within a step 606 during a third timeframe, non-zero values for the carrier types within the second group are chosen based upon a predetermined PAPR threshold. The method 600 can be implemented, for example, during a transmitter training phase or an initialization process.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for decreasing peak to average power ratio (PAPR) for a multicarrier modulation signal including two or more groups of carriers, the method comprising:
 (a) during a first timeframe (i) assigning non-zero values for carrier types within a first of the two or more groups and (ii) assigning zero values for carrier types within a second of the two or more groups after assigning the non-zero values;
 (b) during a second timeframe (i) choosing arbitrary non-zero values for the carrier types within the second group; and
 (c) during a third timeframe optimally determining non-zero values for the carrier types within the second group based upon a predetermined PAPR threshold.

2. The method of claim 1; wherein step (a) includes selecting a target PAPR, choosing a set of reserved tones, and
 wherein step (a) further comprises (iii) computing a first PAPR and determining whether the first PAPR meets predetermined constraints.

3. The method of claim 2, wherein the step (a)(iii) includes computing a fast Fourier transform.

4. The method of claim 3, wherein step (b) further comprises (ii) computing a second PAPR based upon the arbitrary non-zero value carrier types within the second group if the first PAPR does not meet the predetermined constraints and (iii) determining whether the computed PAPR meets predetermined constraints.

5. The method of claim 1, wherein carrier types within the first group include at least one of data carriers, continuous pilots, and scattered pilots; and
 wherein carrier types within the second group includes reserved tones.

6. The method of claim 1, wherein steps (a)-(c) are performed during an initialization sequence.

7. The method of claim 6, wherein the multi-carrier modulation signal is at least one of an orthogonal frequency division multiplexing (OFDM) signal and a discrete multi-tone modulation (DMT) signal.

8. The method of claim 7, wherein steps (a)-(c) are performed within an OFDM transmitter.

9. A computer readable medium carrying one or more sequences of one or more instructions for execution by one or more processors to perform a method of decreasing peak to average power ratio (PAPR) for a multi-carrier modulation signal including two or more groups of carriers, the instructions when executed by the one or more processors, cause the one or more processors to:
   (a) during a first timeframe (i) assign non-zero values for carrier types within a first of the two or more groups and (ii) assign zero values for carrier types within a second of the two or more groups after assigning the non-zero values;
   (b) during a second timeframe (i) choose arbitrary non-zero values for the carrier types within the second group; and
   (c) during a third timeframe optimally determine non-zero values for the carrier types within the second group based upon a predetermined PAPR threshold.

10. The computer readable medium of claim 9, wherein step (a) includes selecting a target PAPR, choosing a set of reserved tones, and wherein step (a) further comprises (iii) computing a first PAPR and determining whether the first PAPR meets predetermined constraints.

11. The computer readable medium of claim 10, wherein the step (a)(iii) includes computing a fast Fourier transform.

12. The computer readable medium of claim 11, wherein step (b) further comprises (ii) computing a second PAPR based upon the arbitrary non-zero value carrier types within the second group if the first PAPR does not meet the predetermined constraints and (iii) determining whether the computed PAPR meets predetermined constraints.

13. The computer readable medium of claim 9, wherein carrier types within the first group include at least one of data carriers, continuous pilots, and scattered pilots; and
   wherein carrier types within the second group includes reserved tones.

14. The computer readable medium of claim 9, wherein steps (a)-(c) are performed during an initialization sequence.

15. The computer readable medium of claim 14, wherein the multi-carrier modulation signal is at least one of an orthogonal frequency division multiplexing (OFDM) signal and a discrete multi-tone modulation (DMT) signal.

16. The computer readable medium of claim 15, wherein steps (a)-(c) are performed within an OFDM transmitter.

* * * * *